United States Patent
Eccleston et al.

(10) Patent No.: US 9,910,968 B2
(45) Date of Patent: Mar. 6, 2018

(54) AUTOMATIC NOTIFICATIONS FOR INADVERTENT FILE EVENTS

(71) Applicant: Dropbox, Inc., San Francisco, CA (US)

(72) Inventors: Matt Eccleston, San Francisco, CA (US); Stacey Sern, Edison, NJ (US); Marcio von Muhlen, San Francisco, CA (US)

(73) Assignee: Dropbox, Inc., San Francisco, CA (US)

(*) Notice: Subject to any disclaimer, the term of this patent is extended or adjusted under 35 U.S.C. 154(b) by 118 days.

(21) Appl. No.: 14/984,729

(22) Filed: Dec. 30, 2015

(65) Prior Publication Data

US 2017/0193201 A1    Jul. 6, 2017

(51) Int. Cl.
*G06F 21/00* (2013.01)
*G06F 21/10* (2013.01)

(52) U.S. Cl.
CPC ................... *G06F 21/10* (2013.01)

(58) Field of Classification Search
CPC ....................................................... G06F 21/10
See application file for complete search history.

(56) References Cited

U.S. PATENT DOCUMENTS

| | | | | |
|---|---|---|---|---|
| 5,613,079 A * | 3/1997 | Debique | ........... | G06F 17/30212 711/141 |
| 2002/0147733 A1* | 10/2002 | Gold | ................... | G06F 11/1464 |
| 2003/0154396 A1* | 8/2003 | Godwin | ................ | G06F 21/552 726/23 |
| 2003/0163449 A1* | 8/2003 | Iwano | ................... | G06F 3/0601 |
| 2005/0138111 A1* | 6/2005 | Aton | ................... | G06F 11/3476 709/201 |
| 2008/0243632 A1* | 10/2008 | Kane | ................. | G06F 17/30867 705/14.66 |
| 2009/0254970 A1* | 10/2009 | Agarwal | ............. | H04L 63/1425 726/1 |
| 2011/0113092 A1* | 5/2011 | Rakowski | ........... | G06F 9/44505 709/203 |
| 2014/0026182 A1 | 1/2014 | Pearl et al. | | |
| 2014/0181053 A1* | 6/2014 | Belanger | ........... | G06F 17/30002 707/687 |
| 2014/0298041 A1* | 10/2014 | Consalus | .............. | G06F 21/602 713/193 |
| 2015/0012495 A1 | 1/2015 | Prahlad et al. | | |
| 2015/0019654 A1 | 1/2015 | Wheeler et al. | | |
| 2015/0039625 A1* | 2/2015 | Nisbet | ..................... | G06F 9/542 707/746 |

(Continued)

FOREIGN PATENT DOCUMENTS

WO    2015/039028 A1    3/2015

*Primary Examiner* — Morshed Mehedi

(74) *Attorney, Agent, or Firm* — Polsinelli PC

(57) ABSTRACT

A content management system can detect file events that are suspected to be in error, and notify users having access to files affected by the detected file events of the detected events. The content management system can maintain a log of file events including a plurality of file identifiers. The file identifiers identify files that are associated with a namespace, a file event, and a user account responsible for the file event. An analytics module can analyze the log of file events and notify the user of a suspected error when it may be that the file events were inadvertent. A notification can include a link to restore (undo) the file events if the user confirms that the file events were in error.

18 Claims, 7 Drawing Sheets

(56) References Cited

U.S. PATENT DOCUMENTS

| | | | |
|---|---|---|---|
| 2015/0082197 A1* | 3/2015 | Pearl | G06F 3/048 |
| | | | 715/753 |
| 2015/0242447 A1* | 8/2015 | Ipeirotis | G06F 17/30303 |
| | | | 705/14.45 |
| 2016/0306871 A1* | 10/2016 | Chauhan | G06F 17/30601 |
| 2016/0373610 A1* | 12/2016 | Ohtake | G06F 3/1222 |

* cited by examiner

| Timestamp | File ID | Namespace | Path | User ID | File Event |
|---|---|---|---|---|---|
| t1 | 1 | A | /folder/filename1.doc | A1 | delete |
| t2 | 45 | CC | /folder/filename2.doc | B1 | add |
| t3 | 9 | G | /folder/filename3.doc | C1 | edit |
| t4 | 1,567 | I | /folder/filename4.doc | D1 | view |
| t5 | 487 | RR | /folder/filename5.doc | E1 | share |
| t6 | 46 | HR | /folder/filename6.doc | F1 | comment |
| t7 | 456 | B | /folder/filename7.doc | G1 | delete |
| t8 | 747 | ER | /folder/filename8.doc | H1 | delete |
| t8 | 747 | ER | /folder2/filename8.doc | H1 | add |
| t9 | 456 | ER | /folder/filename9.doc | H1 | delete |
| t9 | 5 | ER | /folder/filename10.doc | H1 | delete |
| t9 | 56 | ER | /folder/filename11.doc | H1 | delete |

FIG. 2

FIG. 4A

We noticed you recently deleted a large number of files from your Dropbox. Deleted files are stored for 30 days (or more if you have a Pro or Business account), and you can easily restore them during that time.

Just go to www.dropbox.com/events, find and click the name of a deletion event, and click the Restore link. You can learn more in the Help Center at www.dropbox.com/help/490.

We thought you should know about these large deletion event(s) that occurred in the last day.

404 → You deleted 2,101 files — more details

406 → You deleted file9999.txt and 1,372 other files — more details

408 → You deleted filewithanincrediblyreallypretty...ame9.txt and 38 other files — more details Would you like to receive emails like this in the future?

Yes please notify me

FIG. 4B

AUTOMATIC NOTIFICATIONS FOR INADVERTENT FILE EVENTS

BACKGROUND

In some instances users of a content management system can intend to make changes to copies of files stored on a client device, while believing that these changes are not reflected at the content management system. One such way this happens is when a user believes that the content management system is meant to function as backup storage as opposed to an active content management system. Different content management systems have different behaviors and this can lead to confusion. Furthermore, changes can sometime be made maliciously by malware without the knowledge of the user.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, devices, and non-transitory computer-readable storage media for detecting file events that are suspected to be in error, and notifying users having access to files affected by the detected file events of the detected events. A notification can include a link to restore (undo) the file events if the user confirms that the file events were in error.

An example computer implemented method can maintain a log of file events including a plurality of file identifiers. The file identifiers identify files that are associated with a namespace, a file event, and a user account responsible for the file event. An analytics module can analyze the log of file events to identify a total number of deletion events associated with a first namespace of the plurality of namespaces and associated with a first user account of the one or more user accounts, and send a notification to the first user when the total number of deletion events is greater than a threshold. Such notification can serve to notify the user of a suspected error when it may be that the deletion events were inadvertent. The notification can also include a link to restore the file events.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 2 shows an example file log;

FIGS. 4A and 4B show example notifications in accordance with the present technology;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for notifying users of likely inadvertent changes to files in a content management system. While changes to files in a content management system are a normal occurrence, an analysis of all changes over a time period can reveal file events that seem unusual. For example, a deletion of a file is a normal file event, but deletion of a large number of files from a directory shared by multiple users can often be an inadvertent error. When possible inadvertent errors are detected, it can be helpful to alert the user and provide a mechanism to undo the changes.

Figure 1:
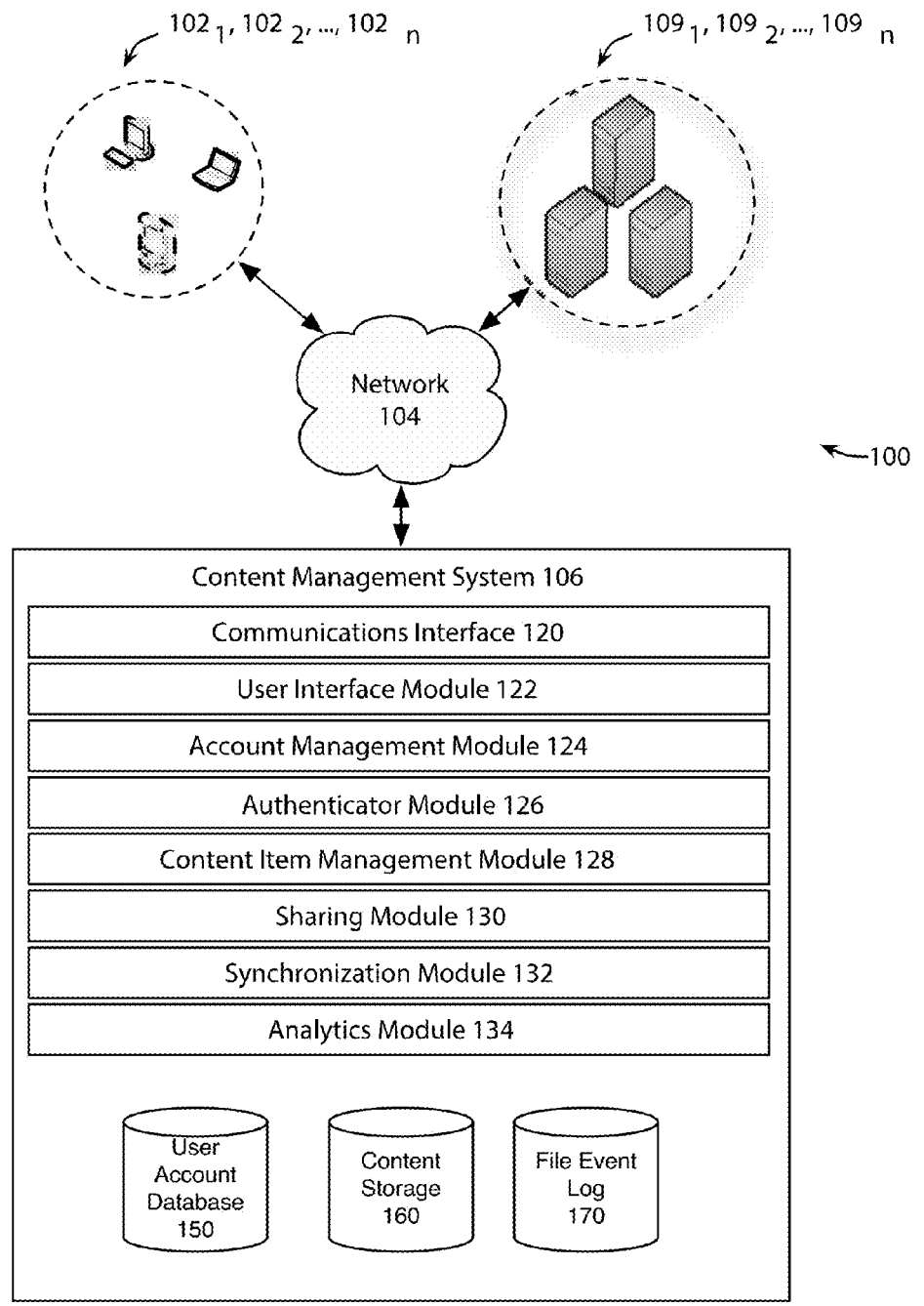
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2$, ..., $102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc. Any user information or account information would be stored and used according to an industry accepted privacy policy.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, ..., 109$_n$ (collectively "109") via an Application Program Interface (API). Certain software applications can access content storage 160 via an API on behalf of a user. For example, a software package, such as an application running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing and sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

In some embodiments content management system 106 includes file event log 170 that is configured to record events taking place with files or folders in content management system 106. A non-exclusive list of file events can include add, delete, edit, view, share, comment, etc. File event log 170 can include data to identify when a file event occurred, a file identifier, a user that performed the file event, and the events, among other attributes. In some embodiments file event log 170 can be queried by analytics module 132 to aggregate file operations or user actions, to determine technology, usage, or business metrics, to aid search results when searching for a file, and to identify potentially unintentional actions performed by user device 102$_i$.

While content management system 106 is presented with specific components, it should be understood by one skilled in the art that the architectural configuration of system 106 is simply one possible configuration and that other configurations with more or fewer components are possible.

FIG. 2 illustrates an example data stored in file event log 170. As illustrated in FIG. 2, the data within the file event log can be stored in a table, but persons ordinarily skilled in the art will appreciate many other data structures are possible. Further it will be appreciated that more or less information than timestamp (column 202), File ID (column 204), Namespace (column 206), Path (column 208), User ID (column 210), and File Event (column 212) can be captured in file event log 170.

As illustrated in FIG. 2, file event log 170 includes file events (column 212) associated with a file. Each file event corresponding to a file or folder can be recorded in file event log 170. A non-exhaustive list of file events can include add, delete, edit, view, share, comment, etc. In the first row of the table illustrated in FIG. 2 corresponding to timestamp 't1,' the file event (column 212) is a delete file event.

A file ID in column 204 can identify each file in the table. For example, the delete file event in the first row (timestamp 't1') is associated with a file given file identifier "1" in column 204. File identifiers (column 204) can be any assigned value or a hash of the file name or portion of the file contents. In some embodiments the file can be identified by the file name in the path stored in column 208, and an explicit file identifier such as illustrated in column 204 may not be needed.

A file event, such as the delete file event in the first row of the table is also associated with a timestamp (column 202). In some embodiments, the timestamp can be the time that the file event was committed to content management system 106. In some embodiments the timestamp can be a time that the file event actually occurred (file events can occur on client device 102 and synced and committed to content management system 106 using synchronization module 132 at a later time).

A file event, such as the delete file event in the first row of the table is also associated with a Namespace (column 206). A namespace can be considered to be analogous to a root level of a file system directory, except that content management system 106 manages many namespaces. As such, each namespace is an abstraction for the root directory of a more traditional file system directory tree. Each user has private access to a root namespace. In addition, every shared collection is a namespace that can be mounted within one or many root namespaces. With this abstraction, every file and directory on content management system 106 can be uniquely identified by two values: a namespace (column 206) and a relative path (column 208). The namespaces shown in column 206 can be root namespaces or shared collection namespaces. The paths shown in column 208 reflect a path under either a root namespace or shared collection namespace. The path can identify subdirectories and end in a file name.

The table illustrated in FIG. 2 also includes User IDs shown in column 210. Each user ID has access to a root namespace, and any shared namespace (shared collection) made available to the user through a root namespace. The User ID shown in column 210 can reflect the user that caused the file event. For files in a root namespace, this is the user that owns the private root namespace. However, for files in a shared namespace, many users have access to the same file, and thus the user that is responsible for the file event is recorded in file event log 170.

Figure 3:
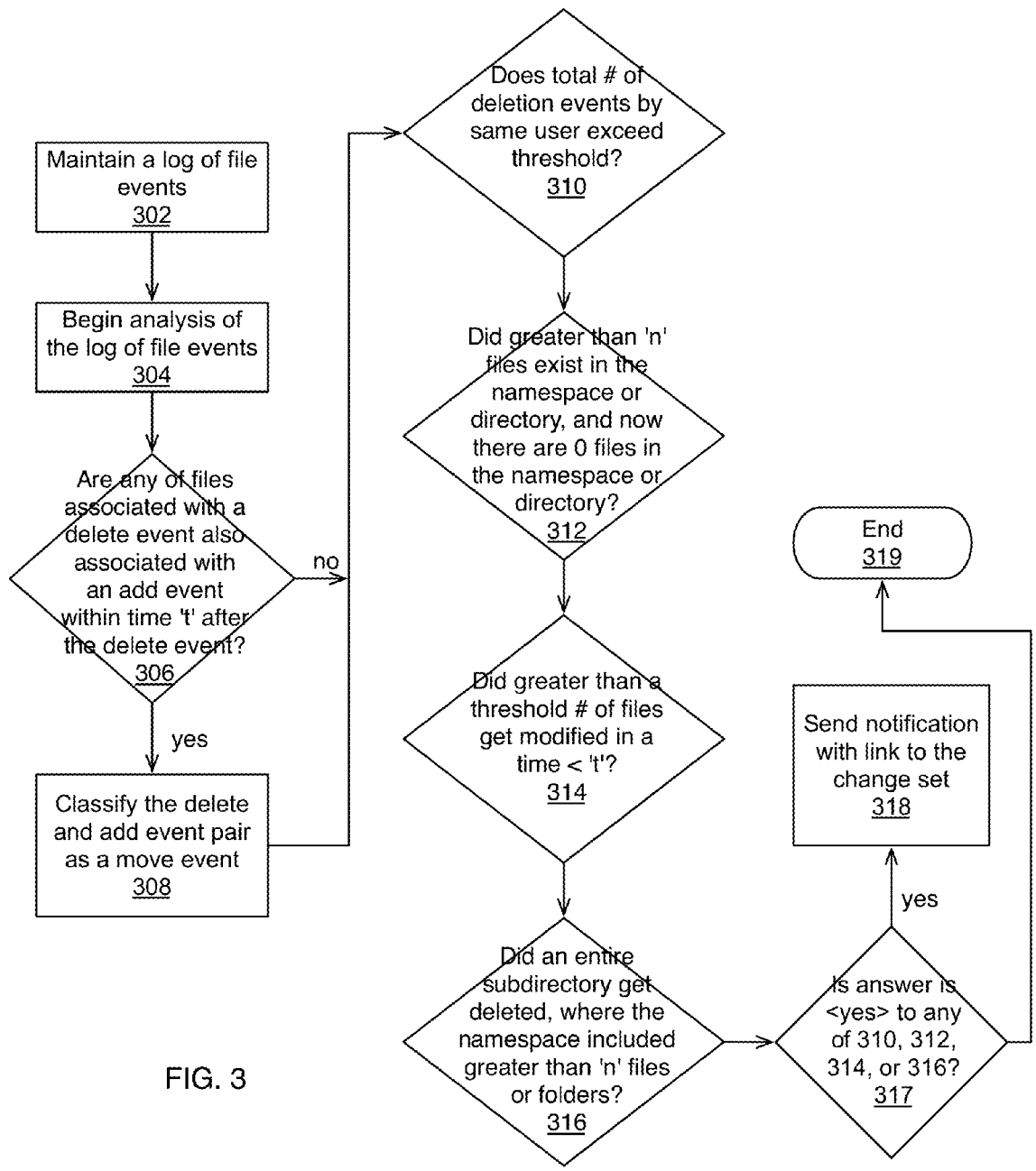
FIG. 3 shows an example method of the present technology.

FIG. 3 illustrates an example method for utilizing file event log 170 to determine when to send proactive notifications to one or more users. The method illustrated in FIG. 3 includes maintaining a log of file events 302. As illustrated in the example file event log in FIG. 2, file event log 170 can include a plurality of file identifiers (column 204 and/or file names in column 208) each respectively associated with a namespace (column 206), a file event (column 212), and a user account (column 210) responsible for the file event.

The file event log 170 can be analyzed 304 by analytics module 134 of content management system 106 to identify whether a proactive notification should be sent to one or more users. As illustrated in FIG. 3, notifications can be sent pending outcomes of various heuristics represented as 310, 312, 314, and 316, which each correspond to user actions for which it is desirable to notify users because the actions can have unintended consequences or appear to be an error.

FIG. 3 illustrates that before progressing through the heuristics 310, 312, 314, and 316, analytics module 134 can interpret the data in the log of file events 306. In some embodiments, the log of file events records raw file events as they occur. Accordingly, a file event that might include multiple smaller events may not be reflected in the file event log 170. That is, file event log 170 may not be monitored and changed to reflect situations where the actual event is a compound event that is reflected as series of raw file events. For example, when a user moves a file from a first directory to a second directory, the log of file events can record raw file events of deleting the file from the first directory and adding the file to the second directory, but will not reflect the compound event of a move. In such instances it can be desirable to identify all such likely compound events as part of the method illustrated in FIG. 3 at 306.

In FIG. 3, the illustrated method determines 306 whether there are any delete event and add event occurring within a time 't' of each other and associated with the same file. If "yes" the method can classify the delete event and add event pair as a move event 308, and does not count these delete and add events individually in future analysis.

Of course, persons of ordinary skill in the art will appreciate that 306 could occur after the heuristics 310, 312, 314, and 316 rather than before as illustrated in FIG. 3. Further, other such interpretations of the data within log of file events can also occur, and the above example of identifying a move event is just one such possible interpretation of the data.

FIG. 3 illustrates several heuristics 310, 312, 314, and 316, which each reflects common user errors for which, when they are detected, it is desirable to notify users that such actions have occurred.

Heuristic 310 can determine if the log of file events includes a total number of deletion events caused by the same user or within the same namespace within a given time period. This heuristic seeks to notify users that a large number of files were deleted. The exact number of deleted files can be selected by a system administrator and adjusted over time to yield better performance of the heuristic. In some embodiments, the threshold number of files could be a percentage of total files in a users root namespace. If the condition is met, a notification is sent to the user 318. In some embodiments, the other heuristics 312, 314, and 316 are also considered in series (as shown) or in parallel to determine if multiple notification heuristics are triggered before sending the notification 318.

Heuristic 312 can determine if a greater than 'n' number of files existed in the namespace or directory before the deletion events, and now there are 0 files in the namespace or directory. This heuristic aims to notify users of inadvertent deletions within a namespace or directory. For example, a commonly observed error in content management system 106 occurs within shared namespaces wherein users drag all files from within the shared namespace to another location on their local file system on one of devices 102. In such instances, users sometimes believe that this operation will maintain a copy of the file(s) in the shared namespace, and place a copy in another location on their local directory (a similar behavior could occur for a mounted network drive). However, in some instances the drag operation deletes the files from the shared namespace. In some embodiments, to meet the conditions of heuristic 312, the shared namespace or directory must still exist, but be empty. In some embodiments, an administrator of content management system 106 can set the number ('n') of files that must be in the namespace or directory. Accordingly, when heuristic 312 is met, a notification is sent to the user 318. In some embodiments, the other heuristics 310, 314, and 316 are also considered in series (as shown) or in parallel to determine if multiple notification heuristics are triggered before sending the notification 318.

Heuristic 314 can determine if greater than a threshold number of files have been modified in a time <'t'. This heuristic aims to notify users if malware may have accessed their files. For example, it would be suspicious if a user were to access a large number of files in only a few seconds (especially if the number of files and the time period were such that such actions would be impossible to perform without a script). In some embodiments, an administrator of content management system 106 can set the number of files or the time ('t'). Accordingly, when heuristic 314 is met, a notification is sent to the user 318. In some embodiments, the other heuristics 310, 312, and 316 are also considered in series (as shown) or in parallel to determine if multiple notification heuristics are triggered before sending the notification 318.

Heuristic 316 can determine if an entire subdirectory is deleted, where the shared namespace included greater than 'n' files or folders. This heuristic aims to notify users of a similar issue as heuristic 312. A shared namespace can include subdirectories, and when a user having access to the shared namespace deletes a whole subdirectory, this can be an indication that the user attempted to copy a folder elsewhere on their local directory and inadvertently deleted the subdirectory. In some embodiments, an administrator of content management system 106 can set the number ('n') of files that must be in the namespace or directory. In some embodiments, the other heuristics 310, 312, and 314 are also considered in series (as shown) or in parallel to determine if multiple notification heuristics are triggered before sending the notification 318. The order in which the heuristics are applied can also be adjusted.

It will be appreciated that other heuristics are possible, and that many variations to the described heuristics are possible. One such variation can be dependent on the access point used to cause the file events. For example, the heuristics described above reflect common errors that may occur when a user is accessing files on their personal computing device. That is, client device $102_i$ can have an application installed that permits certain file management behaviors such as the move behavior described with respect to some of the heuristics above. However, if a user were to access the content management system through a web site, or application with limited functionality that has a different set of possible behaviors, such common errors might not be possible, or as easily performed. Accordingly, file event log 170 might also record the method of access and the heuristics could be specific to common errors performed by users when utilizing a particular method of access.

In some embodiments, the heuristics described herein analyze only file events having a timestamp within a time period. For example, the method illustrated in FIG. 3 can be configured to run once every day, and would only consider file events changed since the method was last performed.

In some embodiments, the heuristics described herein analyze only file events that can be restored (undone).

In some embodiments, the various thresholds corresponding to the heuristics can be adjusted depending on whether the file events apply to a root namespace or a shared namespace. For example, since the likelihood of deletion events being inadvertent is greater in shared namespaces, the threshold number of deletion events required to trigger a notification could be greater in root namespaces and lower in shared namespaces. Specifically, the threshold can be "y" number of deletion events when the deletion events are associated with a root namespace, and the threshold can be "x" number of deletion events when the deletion events are associated with a shared namespace, where x<y.

In another example, the threshold for a notification can be lower when a whole folder is deleted from a shared namespace. Specifically, the threshold can be "y" number of deletion events when the deletion events are associated with a root namespace, and the threshold can be "w" number of deletion events when the deletion events correspond to a whole subdirectory within a shared namespace, where w<y.

In another example, the threshold for a notification can be lower when all files in the shared namespace (or a directory within the shared namespace) are deleted but the shared namespace still exists (or a directory within the shared namespace). Specifically, the threshold can be "y" number of deletion events when the deletion events are associated with a root namespace, and the threshold can be "v" number of deletion events when the deletion events correspond to all files within a shared namespace, but the shared namespace is not deleted, where v<y.

In the example above, the variables can have the relationship of v<w<x<y, but persons of ordinary skill in the art will recognize that the each of the variables could be adjusted to any threshold or be the same.

In some embodiments, the heuristics 310, 312, 314, and 318 can be analyzed in a different order, or in parallel. Additionally, more or less heuristics are possible.

If any of the heuristics 310, 312, 314, or 318 are satisfied (illustrated as step 317) the content management system can send a notification with a link to the change set 318, or if none of the heuristics are satisfied, the method can end 319. While FIG. 3 illustrates a separate step 317 to determine if a notification should be send, in some embodiments the sending of the notification can be the output of any of heuristics 310, 312, 314, or 318.

Notification 318 can be sent to one or more users, such as the user responsible for the file events that triggered the notification. In addition, if the file events took place on files in a shared namespace, the notification could be sent to a user that created the shared namespace, a user that put the file in the shared namespace, or all users with access to the shared namespace.

The notification can include a link to the change set. A change set can be list of all files that triggered one of the heuristics. Thus the link can lead to a webpage showing all files with file events that triggered the heuristic to send the notification, and the webpage can provide functionality to undo the entirety of the changes, or undo a limited number of the changes.

FIGS. 4A and 4B illustrate example notifications. Since one purpose of the notifications is to alert a user of possible inadvertent file events. Accordingly, because one cause of the inadvertent file events can be a misunderstanding of the functioning of the system by users, the notifications can include a tutorial component, which can educate users and prevent future errors.

Notifications can include a link to a change set. In some embodiments a link can be for all changes deemed possibly inadvertent based on the heuristics. One such link is illustrated as 402 in FIG. 4A. FIG. 4B illustrates a notification wherein multiple heuristics may have identified multiple change sets, and accordingly FIG. 4B illustrates several links 404, 406, 408, each to a different change set.

Figure 5:
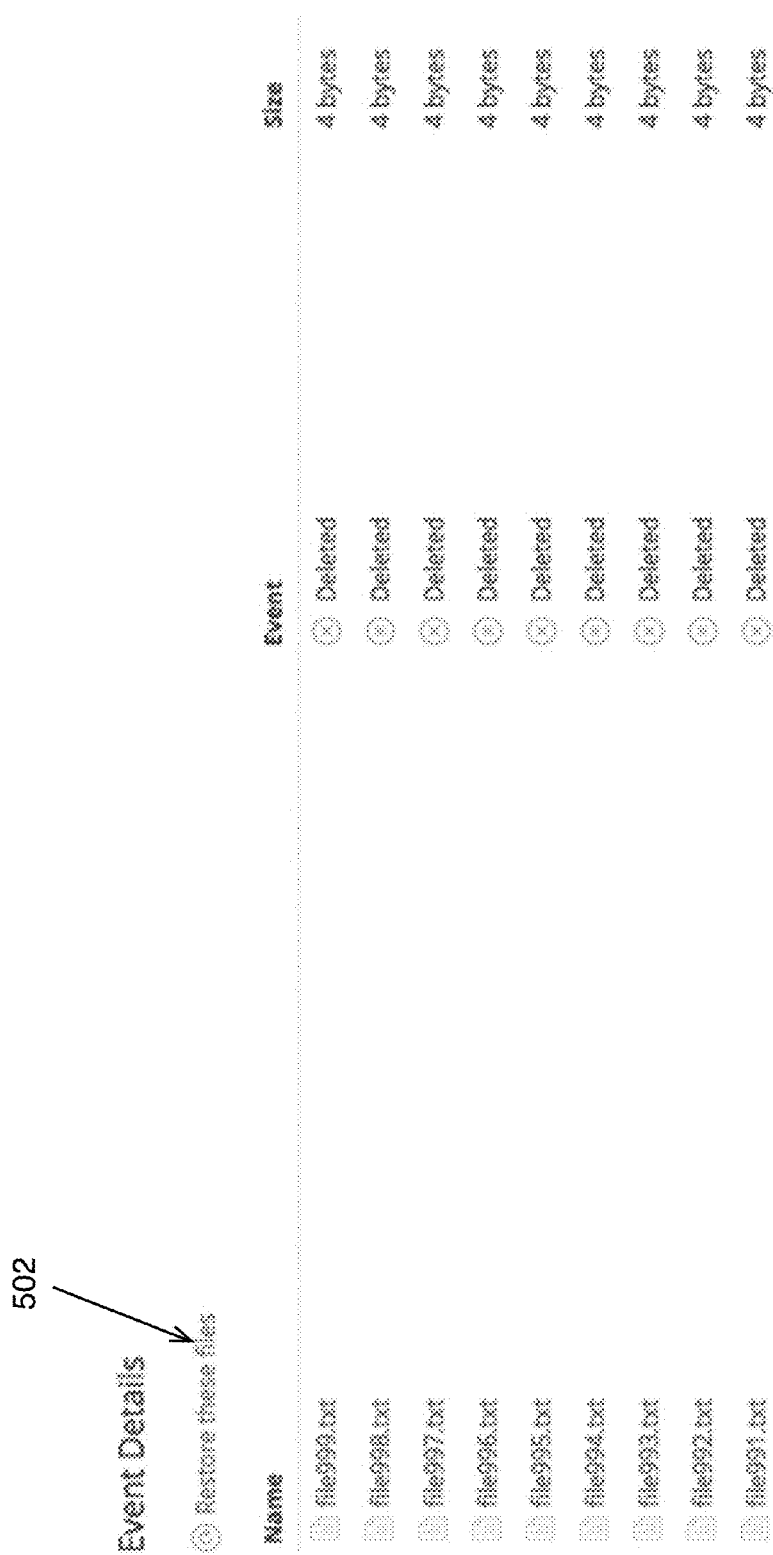
FIG. 5 shows an example change set in accordance with the present technology.

FIG. 5 illustrates an example change set. FIG. 5 illustrates the files and the event associated with each file. In some embodiments, the change set includes link 502 that can restore the entire change set. In some embodiments (not shown), the change set can include individual links for each file to allow restoration of some but not all files in the change set.

Figure 6:
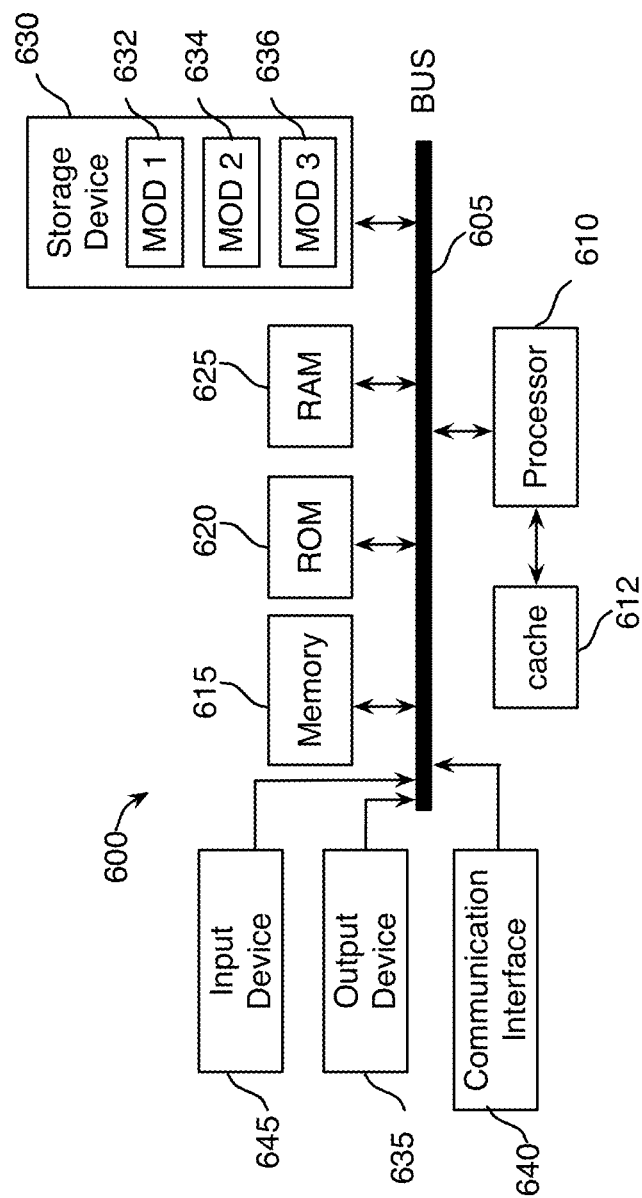
FIG. 6 shows an example possible system embodiment for implementing various embodiments of the present technology.

FIG. 6 illustrates a conventional system bus computing system architecture 600 such as can be used in content management system 106, devices 102, and partner systems 109. Those of ordinary skill in the art will appreciate that other system architectures are also possible.

In computing system architecture 600 the components of the system are in electrical communication with each other using a bus 605. Example system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

It can be appreciated that example system 600 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer-readable medium of a content management system for storing files, each file being associated with one of a plurality of namespaces and one or more user accounts, the non-transitory computer-readable medium comprising: computer executable instructions stored on the computer-readable medium, the computer executable instructions, when executed by a computing device cause a computer to:
   maintain a log of file events, the log including a plurality of file identifiers each respectively associated with a namespace, a file event, and a user account responsible for the file event;
   analyze the log of file events to identify a total number of compound events associated with a first namespace of the plurality of namespaces and associated with a first user account of the one or more user accounts;
   analyze the log of file events to identify a total number of deletion events, excluding the total number of compound events, associated with the first namespace of the plurality of namespaces and associated with the first user account of the one or more user accounts; and
   send a notification to the first user when the total number of deletion events, excluding the total number of compound events, is greater than a threshold, the notification identifying the deletion events not associated with the compound events.

2. The non-transitory computer-readable medium of claim 1, wherein the log of file events also includes a timestamp associated with each file event, and the instructions to analyze the log of file events analyze only file events having a timestamp within a time period, and the instructions to send the notification to the first user executes when the total number of deletion events is greater than a threshold in the time period.

3. The non-transitory computer-readable medium of claim 2, wherein the notification includes a link to restore all files associated with deletion events during the time period.

4. The non-transitory computer-readable medium of claim 1, wherein the instructions to analyze the log of file events to identify the total number of deletion events only includes a specific deletion event in the total number of deletion events ifor a recoverable deleted file associated with the deletion event.

5. The non-transitory computer-readable medium of claim 1, wherein the instructions to analyze the log of file events to identify the total number of deletion events only includes a specific deletion event in the total number of deletion events when the file associated with the specific deletion event is not also associated with a specific compound event for the file, wherein the specific compound event is associated with an add event after the specific deletion event.

6. The non-transitory computer-readable medium of claim 1, wherein the threshold is "y" number of deletion events when the deletion events are associated with a root namespace, and the threshold is "x" number of deletion events when the deletion events are associated with a shared namespace, where x<y.

7. The non-transitory computer-readable medium of claim 1, wherein the threshold is "y" number of deletion events when the deletion events are associated with a root namespace, and the threshold is "w" number of deletion events when the deletion events correspond to a whole subdirectory with a shared namespace, where w<y.

8. The non-transitory computer-readable medium of claim 1, wherein the threshold is "y" number of deletion events when the deletion events are associated with a root namespace, and the threshold is "v" number of deletion events when the deletion events correspond to all files within a shared namespace, but the shared namespace is not deleted, where v<y.

9. A method executable by a content management system for storing files, each file being associated with one of a plurality of namespaces and one or more user accounts, the method comprising:
   maintaining a log of file events, the log including a plurality of file identifiers each respectively associated with a namespace, a file event, and a user account responsible for the file event;
   analyzing the log of file events to identify a total number of compound events associated with a first namespace of the plurality of namespaces and associated with a first user account of the one or more user accounts;
   analyzing the log of file events to identify a total number of deletion events, excluding the total number of compound events, associated with the first namespace of the plurality of namespaces and associated with the first user account of the one or more user accounts; and
   sending a notification to the first user when the total number of deletion events, excluding the total number of compound events, is greater than a threshold, the notification identifying the deletion events not associated with the compound events.

10. The method of claim 9, wherein the log of file events also includes a timestamp associated with each file event, and analyzing the log of file events only includes file events having a timestamp within a time period, and the notification is sent to the first user when the total number of deletion events is greater than a threshold in the time period.

11. The method of claim 10, wherein the notification includes a link to restore all files associated with deletion events during the time period.

12. The method of claim 9, wherein analyzing the log of file events to identify the total number of deletion events only includes a specific deletion event in the total number of deletion events for a recoverable deleted file associated with the deletion event.

13. The method of claim 9, wherein analyzing the log of file events to identify the total number of deletion events only includes a specific deletion event in the total number of deletion events when the file associated with the specific deletion event is not also associated with a specific compound event for the file, wherein the specific compound event is associated with an add event after the specific deletion event.

14. A content management system for storing files, each file being associated with one of a plurality of namespaces and one or more user accounts, the system comprising:
   a file event log, the file event log including a plurality of file identifiers each respectively associated with a namespace, a file event, and a user account responsible for the file event;
   an analytics module including a processor and processor executable instructions stored on a non-transitory computer-readable medium comprising, the processor executable instructions effective to cause the analytics module to:
   analyze the log of file events to identify a total number of compound events associated with a first namespace of the plurality of namespaces and associated with a first user account of the one or more user accounts;
   analyze the log of file events to identify a total number of deletion events, excluding the total number of compound events, associated with the first namespace of the plurality of namespaces and associated with the first user account of the one or more user accounts; and
   send a notification to the first user when the total number of deletion events, excluding the total number of compound events, is greater than a threshold, the notification identifying the deletion events not associated with the compound events.

15. The system of claim 14, wherein the file events log also includes a timestamp associated with each file event, and the analytics module including instructions to analyze only file events in the file events log having a timestamp within a time period, and the instructions to send the notification send the notification to the first user when the total number of deletion events is greater than a threshold in the time period.

16. The system of claim 15, wherein the notification includes a link to restore all files associated with deletion events during the time period.

17. The system of claim 14, wherein the instructions to analyze the file events log to identify the total number of deletion events only includes a specific deletion event in the total number of deletion events for a recoverable deleted file associated with the deletion.

18. The system of claim 14, wherein the instructions to analyze the log of file events to identify the total number of deletion events only includes a specific deletion event in the total number of deletion events when the file associated with the specific deletion event is not also associated with a specific compound event for the file, wherein the specific compound event is associated with an add event after the specific deletion event.

* * * * *